United States Patent
Del Prado Pavon et al.

(10) Patent No.: US 7,317,687 B2
(45) Date of Patent: Jan. 8, 2008

(54) TRANSMITTING DATA FRAMES WITH LESS INTERFRAME SPACE (IFS) TIME

(75) Inventors: Javier Del Prado Pavon, Ossining, NY (US); Sai Shankar Nandagopalan, Tarrytown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 43 days.

(21) Appl. No.: 10/559,902

(22) PCT Filed: Jul. 13, 2004

(86) PCT No.: PCT/IB2004/051212

§ 371 (c)(1),
(2), (4) Date: Dec. 8, 2005

(87) PCT Pub. No.: WO2005/008945

PCT Pub. Date: Jan. 27, 2005

(65) Prior Publication Data

US 2006/0120341 A1 Jun. 8, 2006

Related U.S. Application Data

(60) Provisional application No. 60/529,589, filed on Dec. 15, 2003, provisional application No. 60/487,694, filed on Jul. 16, 2003, provisional application No. 60/478,156, filed on Jun. 12, 2003.

(51) Int. Cl.
*H04L 1/00* (2006.01)
*H04L 12/56* (2006.01)

(52) U.S. Cl. .................. 370/235; 370/394; 370/473

(58) Field of Classification Search ............. 370/294, 370/338, 235, 394, 473, 236, 352; 455/510, 455/517
See application file for complete search history.

(56) References Cited

U.S. PATENT DOCUMENTS

| | | | |
|---|---|---|---|
| 7,031,249 B2* | 4/2006 | Kowalski | 370/203 |
| 7,046,650 B2* | 5/2006 | Sherman | 370/338 |
| 7,046,690 B2* | 5/2006 | Sherman | 370/445 |
| 7,161,909 B2* | 1/2007 | Sharma | 370/235 |
| 2001/0014104 A1 | 8/2001 | Bottorff | |
| 2002/0012343 A1 | 1/2002 | Holloway | |
| 2002/0034172 A1 | 3/2002 | Ho | |
| 2002/0067721 A1 | 6/2002 | Kye | |
| 2002/0078249 A1 | 6/2002 | Lu | |
| 2002/0089959 A1* | 7/2002 | Fischer et al. | 370/338 |
| 2002/0122413 A1 | 9/2002 | Shoemake | |

(Continued)

FOREIGN PATENT DOCUMENTS

EP   1 315 335 A1   5/2003

(Continued)

OTHER PUBLICATIONS

IEEE P802.15 Working Group for Wireless Personal Area Networks (WPANs) Oct. 31, 2002, pp. 1-112.

*Primary Examiner*—Sonny Trinh

(57) ABSTRACT

A method of transmitting data frames over a data network comprises a step of sending said data frames from a transmitter to a receiver with an Inter Frame Space (IFS) time, which does not include a time (T2) that the transmitter needs to change from a receiver state to a transmitter state, thus substantially increasing the transmission efficiency.

14 Claims, 1 Drawing Sheet

U.S. PATENT DOCUMENTS

| | | |
|---|---|---|
| 2003/0103521 A1 | 6/2003 | Raphaeli |
| 2005/0050219 A1* | 3/2005 | Choi et al. ................. 709/231 |
| 2005/0111416 A1* | 5/2005 | Ginzburg ................... 370/338 |
| 2005/0135284 A1* | 6/2005 | Nanda et al. ............... 370/294 |
| 2005/0135295 A1* | 6/2005 | Walton et al. .............. 370/328 |
| 2005/0135318 A1* | 6/2005 | Walton et al. .............. 370/338 |
| 2006/0253765 A1* | 11/2006 | Boer et al. .................. 714/749 |

FOREIGN PATENT DOCUMENTS

| | | |
|---|---|---|
| WO | WO 01/33772 A1 | 5/2001 |
| WO | WO 03/048913 A1 | 6/2003 |

\* cited by examiner

TRANSMITTING DATA FRAMES WITH LESS INTERFRAME SPACE (IFS) TIME

This application claims priority to U.S. Provisional Application Ser. Nos. 60/478,156 filed on Jun. 12, 2003, 60/487,694 filed on Jul. 16, 2003, and 60/529,589 filed Dec. 15, 2003 the entire disclosures of which are hereby incorporated by reference.

The present invention relates to data network transmission techniques, and in particular, to an optimized method for more efficiently transmitting data frames, in which the data frames are transmitted over a data network with less Inter Frame Space (IFS) time.

In data transmission, an ARQ (Automatic Retransmission Request) protocol specifies that each frame has to be acknowledged by the receiver with an ACK (Acknowledge) frame. This, however, reduces the efficiency of data transmission since the transmitter has to wait for receiving the ACK before it can send a next data frame. This is also true in a wireless data network using IEEE 802.11 protocol for MAC data frames transmission. To improve the efficiency, IEEE 802.11e defines a No ACK policy in which the frames are not acknowledged, and a Block ACK policy in which the frames are acknowledged in groups with a single Block ACK frame. These new policies considerably reduce the frame overhead and increase the efficiency.

Moreover, IEEE 802.11e has introduced the concept of transmission opportunity (TXOP). By this concept, the non-AP QSTA (non access point QoS enhanced station) and QAP (QoS enhanced access point) contend the medium for time, and once they get access to the channel they can hold the channel for the time specified by TXOPlimit and transmit multiple data frames with an inter frame space (IFS) time which is SIFS (Short IFS). IEEE 802.11e specifies that during a TXOPlimit, a non-AP QSTA/QAP may use the No ACK or Block ACK policy. By No ACK, each frame is transmitted and the ACK is not expected for that frame. If the TXOPlimit were larger than the single frame transmission time and if more frames are pending transmission at the MAC queue, the succeeding frames may be transmitted after SIFS time. Similarly, in the Block ACK policy, frames are transmitted successively with an inter frame space time SIFS before the transmission of the ACKs by the receiver.

This is, however, not optimized in terms of transmission efficiency since SIFS time is actually required only if the receiving non-AP OSTA/QAP were to return an acknowledgement as it includes the time to process the frame plus the receiver (RX) to transmitter (TX) turnaround time. In case of No ACK as well as Block ACK policies, it is not necessary to have the receiver wait for the SIFS time to transmit the ACK frame (except for the last frame in the block ACK policy after which the receiver must send an ACK to the transmitter).

Therefore, there is a need in the art for a method to more efficiently transmit data frames in a data network with less inter frame space (IFS) time.

According to the present invention, a method of transmitting data frames over a data network is provided, which comprises a step of sending the data frames from a transmitter to a receiver with an Inter Frame Space (IFS) time. In particular, the IFS does not include a time that the transmitter needs to change from a receiver state to a transmitter state. Preferably, the IFS only includes a time needed for the transmitter to detect ending of a frame and beginning of a next frame. Thus, the transmitter may transmit the data frames continuously with an IFS shorter than SIFS since it does not include the turnaround time.

The above and further features and advantages of the present invention will be clearer by reading the detailed description of preferred embodiment of the present invention, with reference to the accompanying drawings in which.

Figure 1:
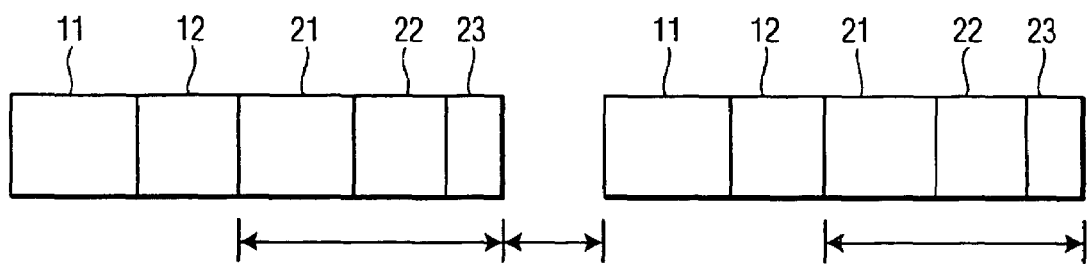
FIG. 1 illustrates transmission of data frames with IFS between frames.

As illustrated in FIG. 1, a data frame typically includes a physical layer control procedure (PLCP) overhead and a MAC data frame. The PLCP overhead comprises a PLCP preamble 11 and a PLCP header 12. The PLCP preamble 11 includes information mainly used for timing and synchronization functions and the PLCP header 12 mainly includes information about the length of the frame, the transmission rate, etc. The MAC data frame comprises a MAC header 21 portion including address information, etc., a MAC frame body portion 22 and a CRC (Cyclic Redundancy Check) portion 23, which is known as Frame Control Sequence (FCS) in the MAC layer.

Figure 2:
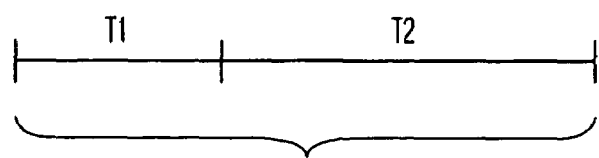
FIG. 2 illustrates that IFS is SIFS as required in the prior art.

When a transmitter continuously transmits sequential data frames to a receiver, an inter frame space (IFS) time is required between transmission of two sequential frames. Conventionally, this IFS time may be as short as SIFS (Short IFS) under No ACK and Block ACK policies adopted by IEEE 802.11e. As shown in FIG. 2, SIFS includes a first portion of time T1 required for the transmitter to process a data frame, i.e., to detect the end of a frame and the start of a next frame, as well as a second portion of time T2, i.e., the "turnaround time" for the transmitter to change from a receiver state to a transmitter state. The SIFS time is a waste under No ACK and Block ACK policies as the transmitter does not need to receive the ACK from the receiver before it can continue to send the next data frame.

According to the present invention, under No ACK and Block ACK policies, the transmitter does not need to wait for SIFS to send a next data frame. In particular, frames that do not need an ACK immediately are transmitted continuously with an IFS which can be much shorter than SIFS. More specifically, the IFS time does not need to include the turnaround time T2 which otherwise is needed for the transmitter to change from the receiver state to the transmitter state, and only includes a time T1 needed for the transmitter to process the frame, i.e., to detect the end of the frame, and the beginning of the next frame. Therefore, data frames can be transmitted with an inter frame space much less than SIFS, thus considerably increasing the transmission efficiency.

Though the above has described the preferred embodiment of the present invention in detail, it shall be appreciated that, without departing the spirit of the present invention, various changes, adaptations and amendments are possible to a skilled person in the art. For example, though the preferred embodiment is described in a wireless data network using IEEE 802.11 protocol amended by IEEE 802.11e draft standard, it is understood that the present invention is not limited to a wireless data network environment. Thus, the protection scope of the present invention is intended to be solely defined in the accompanying claims.

What is claimed is:

1. A method of transmitting a first data frame and a second data frame over a data network, comprising sending said first data frame and said second data frame from a transmitter to a receiver with an inter frame space time between said first data frame and said second data frame, wherein said inter frame space time consists of a time needed for said transmitter to detect ending of said first data frame and beginning of said second data frame, wherein said first data frame and said second data frame each includes a preamble, header and body.

2. The method of claim 1, wherein said transmitter is a non-QSTA (non QoS Enhanced Station) or a QAP (QoS Enhanced Access Point).

3. The method of claim 1, wherein said transmitter is not required to receive an ACK from said receiver before said transmitter sends out said second data frame.

4. The method of claim 1, wherein said transmitter only receives a block ACK which acknowledges both of said first data frame and said second data frame.

5. The method of claim 1, wherein said data network is a wireless data network using IEEE 802.11 protocol.

6. The method of claim 5, wherein said IEEE 802.11 is amended by IEEE 802.11e draft standard.

7. A method for a transmitter to send a first data frame and a second data to a receiver over a data network, the method comprising sending by said transmitter to said receiver said first data frame and said second data frame with a time space between said first data frame and said second data frame, wherein said time space consists of a time for said transmitter to process each of said first data frame and said second data frame, wherein said first data frame and said second data frame each includes a preamble, header and body.

8. The method of claim 7, wherein said time consists of needed time for detecting an end of said first data frame and a start of said second data frame.

9. The method of claim 7, wherein said time space does not include a further time that said transmitter needs to change from a receiver state to a transmitter state.

10. The method of claim 7, wherein said transmitter is a non-QSTA (non QoS Enhanced Station) or a QAP (QoS Enhanced Access Point).

11. The method of claim 7, wherein said transmitter is not required to receive an ACK from said receiver before said transmitter sends out said second data frame.

12. The method of claim 7, wherein said transmitter only receives a block ACK which acknowledges both of said first data frame and said second data frame.

13. The method of claim 7, wherein said data network is a wireless data network using IEEE 802.11 protocol.

14. The method of claim 13, wherein said IEEE 802.11 is amended by IEEE 802.11e draft standard.

* * * * *

INTER PARTES REEXAMINATION CERTIFICATE (1083rd)
United States Patent
Pavon et al.

(10) Number: US 7,317,687 C1
(45) Certificate Issued: Apr. 2, 2015

(54) TRANSMITTING DATA FRAMES WITH LESS INTERFRAME SPACE (IFS) TIME

(75) Inventors: Javier Del Prado Pavon, Ossining, NY (US); Sai Shankar Nandagopalan, Tarrytown, NY (US)

(73) Assignee: Mobile Enhancement Solutions LLC, Frisco, TX (US)

Reexamination Request:
No. 95/002,407, Sep. 15, 2012

Reexamination Certificate for:
Patent No.: 7,317,687
Issued: Jan. 8, 2008
Appl. No.: 10/559,902
PCT Filed: Jul. 13, 2004
PCT No.: PCT/IB2004/051212
§ 371 (c)(1),
(2), (4) Date: Dec. 8, 2005
PCT Pub. No.: WO2005/008945
PCT Pub. Date: Jan. 27, 2005

Related U.S. Application Data

(60) Provisional application No. 60/529,589, filed on Dec. 15, 2003, provisional application No. 60/487,694, filed on Jul. 16, 2003, provisional application No. 60/478,156, filed on Jun. 12, 2003.

(51) Int. Cl.
*H04L 1/00* (2006.01)
*H04L 12/801* (2013.01)
*H04W 28/06* (2009.01)

(52) U.S. Cl.
CPC .............. *H04L 47/10* (2013.01); *H04W 28/06* (2013.01)
USPC ............................ 370/235; 370/394; 370/473

(58) Field of Classification Search
None
See application file for complete search history.

(56) References Cited

To view the complete listing of prior art documents cited during the proceeding for Reexamination Control Number 95/002,407, please refer to the USPTO's public Patent Application Information Retrieval (PAIR) system under the Display References tab.

*Primary Examiner* — Roland Foster

(57) ABSTRACT

A method of transmitting data frames over a data network comprises a step of sending said data frames from a transmitter to a receiver with an Inter Frame Space (IFS) time, which does not include a time (T2) that the transmitter needs to change from a receiver state to a transmitter state, thus substantially increasing the transmission efficiency.

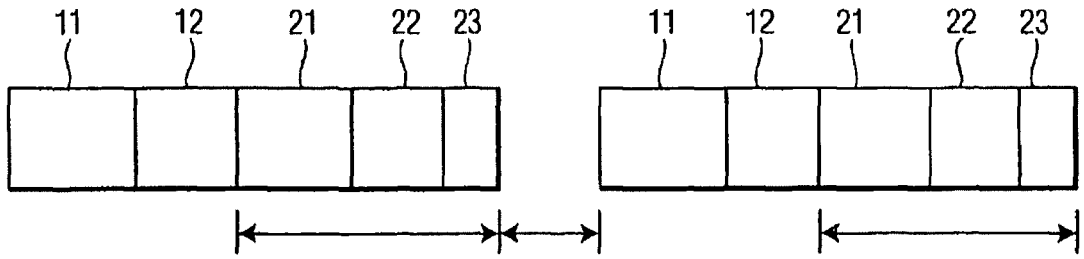

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*